United States Patent [19]
Weber

[11] 3,819,331
[45] June 25, 1974

[54] PHASE SEPARATION APPARATUS

[75] Inventor: Carl L. Weber, Washington Crossing, Pa.

[73] Assignee: Hydrocarbon Research, Inc., New York, N.Y.

[22] Filed: Aug. 9, 1973

[21] Appl. No.: 386,961

Related U.S. Application Data

[63] Continuation-in-part of Ser. No. 137,232, April 26, 1971, abandoned.

[52] U.S. Cl. .................. 23/284, 23/288 S, 55/159, 55/421, 208/213, 210/188, 210/532, 210/539
[51] Int. Cl. ............................ B01j 9/08, B01j 9/20
[58] Field of Search ............ 55/434, 471, 391, 171, 55/172, 173, 175, 176, 177, 159, 421; 210/534, 537, 538, 539, 540, 521, 522, 535, 532, 188; 208/10, 95, 100, 102, 103, 161, 163, 208, 213, 254, 299; 23/274, 281, 282, 284, 285, 287, 288 R, 288 A, 288 S

[56] References Cited
UNITED STATES PATENTS

| | | | |
|---|---|---|---|
| 838,658 | 12/1906 | Silvera | 210/537 X |
| 885,451 | 4/1908 | Deming | 210/56 X |
| 1,345,090 | 6/1920 | Keller | 210/521 X |
| 1,462,748 | 7/1923 | Jones | 210/537 X |
| 2,146,542 | 2/1939 | Hawley | 210/540 X |
| 2,375,232 | 5/1945 | McNitt | 210/539 X |
| 2,565,343 | 8/1951 | Benham | 210/537 X |
| 2,777,581 | 1/1957 | Unthank | 210/539 X |
| 2,987,465 | 6/1961 | Johanson | 208/146 X |
| 3,321,393 | 5/1967 | Schuman et al. | 208/163 X |
| 3,510,006 | 5/1970 | Cheysson | 210/522 |
| 3,540,995 | 11/1970 | Wolk et al. | 208/10 |
| R25,770 | 4/1965 | Johanson | 208/213 X |

FOREIGN PATENTS OR APPLICATIONS 812,554  9/1951  Germany .............................. 210/84

Primary Examiner—Dennis E. Talbert, Jr.

[57] ABSTRACT

In an ebullated bed reactor the further separation of the liquid, gas and solids is achieved by use of a disengaging device in the upper portion of the reactor without disturbing the operation of the ebullated bed. The device is essentially cylindrical with a conical bottom. The liquid-gas-solid mixture enters the reactor through the top of the device while the concentrated solids slurry leaves through the bottom and the gas and solids-free liquid leave through the top.

9 Claims, 3 Drawing Figures

PATENTED JUN 25 1974                    3,819,331

PHASE SEPARATION APPARATUS

CROSS REFERENCE TO RELATED APPLICATIONS

This is a continuation-in-part of application Ser. No. 137,232, filed Apr. 26, 1971 and now abandoned.

BACKGROUND OF THE INVENTION

This invention pertains to the field of separation of gases, liquids and solids from a mixture thereof in an ebullated bed. More particularly, it relates to those gas-liquid contacting processes of the type wherein a liquid feed and gas are passed upwardly through a bed of particulate solids contact material. As a result of the velocities of the liquid and gas, the bed is expanded to a volume over that of its static volume and the particles are put in a state of random motion. Such systems are known as ebullated contacting beds and have been described in U.S. Pat. No. Re. 25,770.

Processes of this type normally involve the contacting of a hydrogen-rich gas with a carbon containing feed material and with a particulate solid to effect either hydroconversion of the feed to more useful products and/or to achieve hydropurification, i.e., removal of sulfer, nitrogen and other impurities. Carbon containing feeds which are normally so treated include predominantly hydrocarbon materials, such as residua, gas oils, distillates, reduced crudes, tar and extracts, coal tar and coal tar extracts and liquid hydrocarbons derived from coal in addition to oxygen containing organic materials, such as lignin and oils and fats including triglycerides of alcohols from said fats. While such hydrogenation processes may be carried out in the presence of a non-catalytic contact particulate solid, it is most usual to utilize a catalyst. The preferred conditions for carrying out these processes are temperatures in the range from about 600° F to about 900° F, pressures in the range from about 500 to about 5,000 psig, and space velocities greater than about 0.25 $V_f$/hr/$V_f$ (volumes of feed per hour per volume of reactor).

The use of the ebullated bed contacting system as described above, has resulted in numerous advantages to the petroleum processing field, particularly with respect to increased distillate yields, longer periods of operability, improved temperature control and temperature uniformity across the reaction zone, increased catalyst life, etc.

A major characteristic of these systems is that while there is bed expansion and turbulent random intermixing of the phases within the reaction zone, most of the particulate solids are retained in the reaction zone with relatively little carryover of solids in the liquid. In fact, the ebullated bed is usually described as having a well defined interface below which the solids concentration is substantially higher than that above the interface.

Recently, it has also been disclosed that improved and unexpected results may be realized by using powdered contact solids having a narrow size distribution within the range of from about 20 to about 325 mesh (U.S. Std), as opposed to the larger extrudate type contact solids. Such powdered catalyst systems present a problem, however, with respect to excessive solids carryover and decreased retention of solids in the reaction zone. In such processes, therefore, it has been necessary to increase the reactor volume such that tHere is a fairly large segment of the reactor above the interface, said portion acting as a disengagement zone or settling zone for the solids. While it has been possible to optimize liquid and gas velocities, liquid and solids densities, etc., so as to further minimize the solids carryover, these efforts have been ineffective towards advancing the economic feasibility of these processes. Thus, the higher solids loss observed with powdered systems, tend to offset the advantages that are obtained from the use thereof to such an extent that the larger extrudate type solids are used predominantly in the commercial systems now in use or being designed.

SUMMARY OF THE INVENTION

Devices have been discovered which allow the catalyst disengagement process to be carried out within the confines of the reactor, without substantial interference with the proper process operating conditions being used. The devices disclosed hereinafter may be used in processes wherein a total gaseous and liquid effluent is removed or wherein the gaseous effluent is removed separately from the liquid effluent. Furthermore, the use of this invention reduces the amount of solids disengaging space normally required in the powdered solids systems, thereby decreasing the overall cost of such systems and allows increased throughputs to be used without the consequence of additional solids carryover.

In powdered solids ebullated systems, a major portion of the solids are retained in a zone with little change in solids concentration from the bottom to the top. Above the zone, however, a concentration gradient exists wherein the concentration of solids decreases as the effluent exit is approached.

While a total effluent, i.e., gas and liquid products combined, may be removed and subjected to separation external of the reactor, it is also typical to separate the gaseous and liquid products within the reactor and remove them separately. In either type system, however, the reaction mixture is in a highly turbulent state at the point of liquid removal due to, first — the relatively high liquid velocities in the area, second — the continuous and profuse bubbling of gas through the liquid. Thus, a truly random mixture of liquid, gas and solid exists.

It has been further found that the presence of the gaseous bubbles has a major effect on the turbulence of the mixture and this turbulence greatly offsets the density difference between the solids and the liquid and, thus interferes with the settling rate of the solids from the liquid. As a result, it is not sufficient simply to put the mixture in a zone of low turbulence, because the gas therein will be continually disengaging therefrom and will inherently cause turbulence. It has, therefore, been found that the entrained gas must necessarily be removed before any condition favorable to solids separation can be created.

Once the gas has been removed, however, turbulence of the liquid is decreased to a level where the density difference between the solid and the liquid can affect settling. It was discovered that this level of turbulence exists when removing the solids-free liquid from the gas-free dilute slurry at a rate less than the solids settling rate. Usually, it is most desirable to confine the dilute slurry in a zone away from that containing the turbulent mixture and to affect the settling within this zone. When the liquid velocity is below the solids settling rate, the liquid drawn off is quite free of solid material and may be removed directly for further downstream treatment. The settled solids which are highly concentrated in the form of a concentrated slurry may then be reintroduced to the high turbulent zone in the reactor.

Within the scope of the process disclosed above apparatuses have been invented which allow the above process to be carried out in the sequence described while being contained within a high pressure reaction vessel that is being used to carry out the heretofore mentioned ebullated bed contacting processes.

While the exact nature of the apparatus depends on whether a total effluent or separate gaseous and liquid effluents are removed from the reaction zone, the basic requirements in each system are the same. There is, however, an additional problem with the removal of a total effluent since the gas must first be separated in order to allow the proper conditions for settling to be obtained as described above, and then must be recombined with the solids free liquid prior to removal. These apparatuses for carrying out that method allow for the recombination of the gas and solids free liquid thereby producing insignificant turbulence such that the recombination does not disturb the solids settling process.

Particularly, the apparatus of this invention gives minimum solids carryover when used in combination with high pressure reaction vessels which are adapted for reacting liquid feed materials with a hydrogen-rich gas at high temperatures and pressures. These vessels usually have means for withdrawal of liquid and gaseous effluents and the disengaging apparatus is normally affixed in the upper portion of the reactor.

DESCRIPTION OF THE PREFERRED EMBODIMENT

Figure 1:
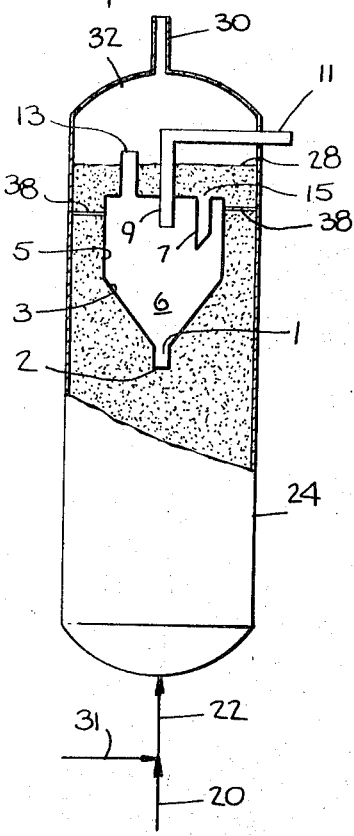
FIG. 1 is a partial vertical cross section and schematic of an ebullated bed reactor showing the arrangement of the disengaging apparatus.

FIG. 1 shows a high pressure ebullated bed reaction vessel and the placement of the disengaging apparatus, as described hereafter, in said vessel. Processes of the type utilizing this invention may be described as follows. A liquid feed material at 20 is fed together with a gas, usually hydrogen, at 31 through line 22 and into reactor 24, which contains a bed of particulate solids 26 and the disengagement device 5 which is held in place by support members 38.

The gas and liquid feed are passed upwardly through the bed 26 to expand it and place the particles in random motion in the liquid. A disengaged gas space 32 exists at the top of the reactor and the remainder of the reactor volume below interface 28 is filled with the turbulent gas-liquid-solid mixture. This mixture is continuously swept past gas disengagement surface 3. The gaseous bubbles impinge upon this surface and because of the obliqueness of the surface, are directed upwardly and outwardly towards the wall of the vessel. The gas passes up through the gas mixture interface 28 to space 32. Surface 3 essentially acts to disengage the gas from the mixture since it acts as a deflecting surface. The gas-free dilute slurry is swept into dilute slurry entrance 15 by the turbulent forces and velocities within the reactor and thereby enter settling chamber 6. The liquid-solid slurry contained within the chamber is substantially out of contact with the highly turbulent zone. As a result of the relative calm of the slurry contained in settling chamber 6, the particulate solids contained therein settle at a rate which is dependent upon the relative density of the solids to the liquid, the particle size of the solids, the viscosity of the liquid, and the upward liquid velocity in the chamber. The settled particulate solids leave the chamber as a concentrated slurry through 1 and exit 2 and reenter the turbulent zone. The solids-free liquid effluent is removed through exit 9 via line 11 from the reactor and any trapped gaseous effluent is removed through line 13.

It is important to note that the main parameter affecting the ability of the solids to settle is the turbulence of the area around the solids and not necessarily the liquid velocity per se. Thus, by removing the gas from the mixture prior to solids settling, it is possible to remove the liquid effluent from the settling chamber at a velocity equal to or greater than the liquid velocity within the reaction system itself. It is only necessary that the upward velocity of the liquid in the settling chamber be less than the settling rate of the solids.

Figure 2:
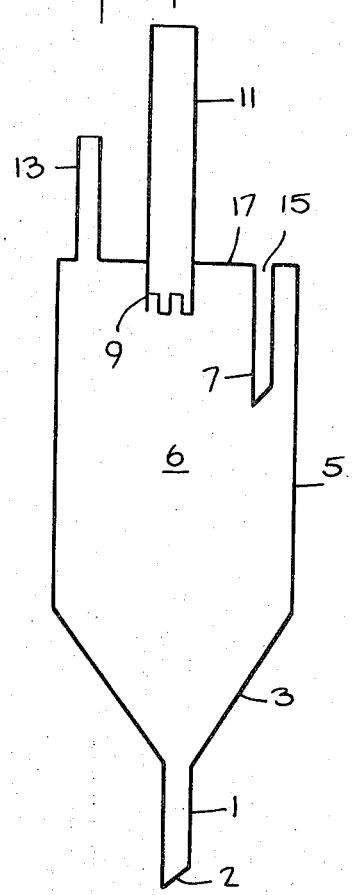
FIG. 2 is a schematic of a single return disengaging apparatus.

FIG. 2 shows a form of a preferred embodiment of a solids separation device for use in an ebullated bed reaction zone. The device has a closed upper end 17 and the dilute solid slurry enters at 15 passing downwardly through 7 to chamber 6 wherein settling takes place. The solids move downwardly through zone 3 and return to the reaction zone through line 1 and exit 2. Any entrained gas leaves through line 13 and the liquid leaves through line 11. Line 11 is adapted at its lower end with traverse openings 9 for smoother entry flow of the liquid effluent. These openings may also be holes or line 11 may have a beveled end.

Figure 3:
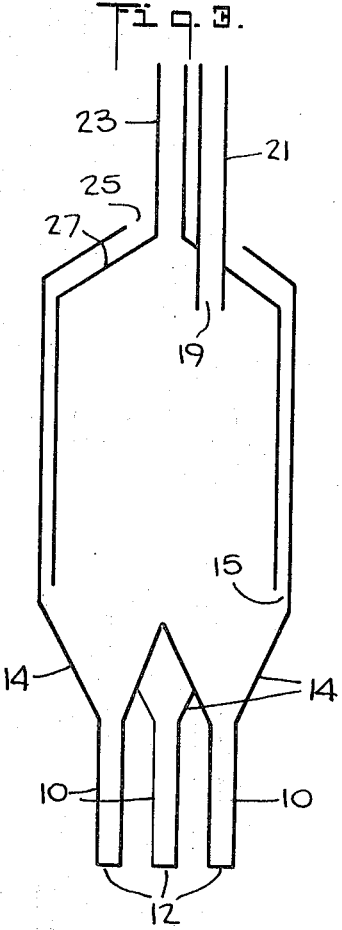
FIG. 3 is a schematic of a multiple return disengaging apparatus.

FIG. 3 shows another form of a preferred embodiment of a multiple return separation device. In this device the dilute solids slurry enters through the upper end of the device 25 which is open. The solids slurry passes downwardly over deflecting shield 27 to settling zone 15. The solids then settle downwardly into zones 14. There are three zones 14 shown here although one or two zones 14 would be suitable. It is preferred to have three or more zones 14 so that solids settling will continue even though one exit becomes blocked. The solids then return to the reaction zone through lines 10 and exits 12. Shield 27 traps any entrained gas which gas then passes out of the settling device in line 23. The solids-free liquid is withdrawn through opening 19 via line 21.

Numerous modifications may easily be devised with respect to the design and formation of the device. The main requirements of the chamber is that it have a dilute slurry entrance or entrances and an exit or exits for removing solids-free liquid and an exit or exits for removing a concentrated slurry resulting from the settling of the particulate solids. In the device shown, the upper or inner cylindrical member is affixed to the lower or outer conical member. It is not necessary that the slurry entrance be a continuous annular opening, but may be simply separate apertures leading to the interior of the settling chamber or tangential openings.

The device must also have means to direct the disengaged gas away from the dilute slurry entrances. This is most easily accomplished as shown by having the disengaging surface directed away from the dilute slurry entrances. In the case, however, where the disengaging means is separate and apart from the device as a whole, it is relatively easy to design the disengaging surfaces so as to direct the disengaged gas away from the dilute slurry entrances. Of course, it is possible, if desired, to have separate disengagement and directing means.

While the dimensional relationships of the disengagement device to the internal volume and diameter of the reaction vessel are not critical, there are preferential dimensions which are described below. Theoretical and practical considerations require that the diameter of the device be sufficiently less than the diameter of the reactor such that the annular space between the outside of the disengagement device and the inside wall of the reactor is large enough to allow liquid slurry and gas mixture to easily pass through the space without resulting in extraordinarily high gas-liquid velocities. Naturally, the liquid velocity in the annular space will be greater than that in the reactor segment contained below the disengagement device, since the feed rate and withdrawal rate remain constant. Particularly, we have found that improved flow into the dilute slurry entrance can be effected by having the area of the cylindrical portion of the disengaging chamber 5 equal to at least 1/2 but not to exceed 3/4 the cross sectional area of the reaction zone 24. While the dimensional relationships of various components of the device to one another are not critical to the operation of the device, such relationships may be optimized extracting maximum efficiency. Once the basic mechanism of the invention is understood, however, such optimization is simply a matter of experimental determination.

EXAMPLE 1

This example shows the solids settling that results from the operation of the device shown in FIG. 2.

| | |
|---|---|
| Reactor Diameter, inches | 6 |
| Disengager Diameter, inches o.d. | 5.25 |
| Disengager Diameter, inches i.d. | 5.10 |
| Disengager Height, inches | 7.0 |
| Reactor Gas Velocity, ft./sec. | 0.10 |
| Reactor Liquid Velocity, ft./sec. | 0.0098 |
| Disengager Liquid Velocity, ft./sec. | 0.0136 |
| Disengager Residence Time, sec. | 24.5 |
| Liquid Density, gm/cc at 60°F | 0.73 |
| Liquid Viscosity, CP | 0.25 |
| Particulate Solid | |
| Absolute Density, gms/cc | 3.2 |
| Size, mesh (U.S. Std.) | 50–270 |
| Solids Settling Rate, | |
| (In Absence of Gas) ft./sec. | 0.02 |

EXAMPLE 2

This example shows the solids settling that results from the operation of the device shown in FIG. 3.

| | |
|---|---|
| Reactor Diameter, inches | 6.0 |
| Disengager Diameter, inches o.d. | 4.75 |
| Disengager Diameter, inches i.d. | 4.25 |
| Disengager Height, inches i.d. | 6.0 |
| Reactor Gas Velocity, ft./sec. | 0.1 |
| Reactor Liquid Velocity, ft./sec. | 0.0098 |
| Disengager Liquid Velocity ft./sec | 0.0195 |
| Disengager Residence Time, sec. | 25.6 |
| Liquid Density, gm/cc at 60°F | 0.73 |
| Liquid Viscosity, CP | 0.25 |
| Particulate Solids | |
| Absolute Density, gm/cc | 3.2 |
| Size, Mesh (U.S. Std.) | 50–270 |
| Solids Settling Rate | |
| (In Absence of Gas) ft./sec. | 0.02–0.05 |

Figure 4:
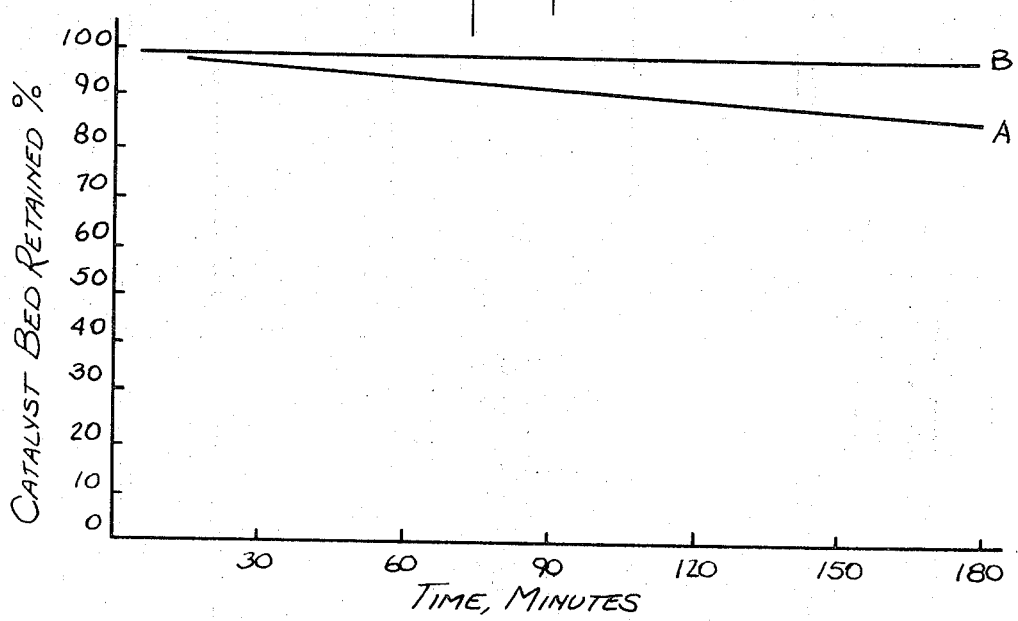
FIG. 4 is a graph showing comparison of solid bed retention for the apparatus of FIGS. 2 and 3.

Examples 1 and 2 give the details of the conditions used for the comparison shown in FIG. 4. The only difference between runs A and B shown in FIG. 4 is the type of device used. Line A represents a FIG. 2 device and line B represents a FIG. 3 device. FIG. 4 graphically shows a comparison of the solids bed retention obtained with the process of the invention using both type of devices as hereinabove described. The devices of FIGS. 2 and 3 were tested in a 6 inch diameter, 95 inch in height plastic tube using catalyst with a bulk density of 1.12 gms/cc and a size between 50 and 270 mesh (U.S. Std.). The reaction zone was operated with heptane at a throughput of 4.4 GPM/Ft$^2$ with a nitrogen rate of 0.1 ft/sec. and a stationary catalyst bed height of 39 inches. From FIG. 4 it can be seen that after 1½ hours the FIG. 3 device has retained 99 percent of the catalyst and the FIG. 2 device has retained 85 percent of the catalyst.

In addition to the processes heretofore described, this invention is uniquely applicable to multiple stage systems which have been found to give certain advantages with respect to increased yields of products and improved operability. It is usual, for instance, to incorporate two or more reaction zones in series with the total effluent from each going to the next subsequent reaction zone. Alternately, multiple stage systems have been operated wherein the gaseous and liquid effluents are removed separately from each stage and only the liquid effluent is passed onto the next subsequent stage with the gaseous effluents from each stage being combined and treated as a reaction product. A third modification is the removing of a total, combined gaseous and liquid effluent from the first stage, introducing this to the second stage and removing separate gaseous and vaporous effluents from the second stage. This particular combination has resulted in somewhat superior sulfur removal when used in a hydrodesulfurization of a petroleum residuum feed material.

Generally, the use of this invention gives substantial advantages in multiple stage catalytic systems because of the absence of contaminated catalyst carryover into the next subsequent stage.

Thus, a device has been discovered for reducing the solids carryover in a system utilizing the ebullated bed contacting method. It is understood, of course, that while in the examples cited above, the results given are those for an experimental size unit, they are applicable in all respects to commercial size units, said application being only a matter of engineering scale-up.

While preferred forms of embodiment of this invention have been shown, modifications within the scope and spirit of this invention will occur to those skilled in the art, and such modifications are contemplated to be within the scope of the claims appended hereinafter.

I claim:

1. In combination with a high pressure ebullated bed reaction vessel adapted for the reacting of a hydrocarbon feed material with a hydrogen rich gas at elevated temperatures and pressures in the presence of a bed composed of a particulate solid contacting agent, said reaction being the type wherein the gas and liquid feed materials are passed upwardly through the bed at velocities whereby the bed is expanded to a volume greater than its static volume and the particulate solid is put in a state of random motion and wherein the mixture of feed, gas and solids constitute a turbulent zone wherein minimum solids settling takes place and wherein there exists a liquid-gas interface above which only a gaseous phase exists and wherein the reaction vessel has means to withdraw both liquid and vaporous effluents therefrom, the improvement which comprises a disengaging device affixed in the upper portion of the vessel for separating the gaseous, liquid and solid materials from one another, said device comprising:

a. a vertical solids settling zone having an upper end and a lower closed end;
b. a dilute solid-slurry entrance through said upper end;
c. a gas exit through said upper end;
d. a solids-free liquid exit through said upper end;
e. a concentrated solid-slurry exit in said lower end.

2. The apparatus of claim 1 wherein said device has a continuous dilute solid slurry deflecting means contained therein and circumscribed thereby wherein said gas exit and said solids-free liquid exit pass through said deflecting means and said upper end.

3. The apparatus of claim 2 wherein said continuous dilute solid slurry deflecting means extends downwardly into said settling zone to a point below that of the point at which said solids-free liquid exit begins.

4. The apparatus of claim 1 wherein said lower closed end comprises an inverted cone having said concentrated solid-slurry exit through the vertex part thereof.

5. The apparatus of claim 4 wherein said lower end comprises at least two inverted cones having concentrated solid-slurry exits through the vertex parts thereof.

6. The apparatus of claim 1 wherein the dilute solid-slurry entrance extends downwardly into said settling zone to a point below that of the point at which the solid-free liquid exit begins.

7. The apparatus of claim 6 wherein the lower end of the solid-free liquid exit is adapted for smoother flow of the liquid.

8. The apparatus of claim 1 wherein said particulate solids are of a size in the range of 20 to 325 mesh U.S. Std.

9. The apparatus of claim 1 wherein said lower end is adapted to provide an initial gas disengaging surface when contacted by the upwardly moving gas-liquid-solids.

* * * * *